April 29, 1930.   A. R. PREECE   1,756,661
FLYWHEEL AND SELF OILING WRIST PINS
Filed Aug. 16, 1928
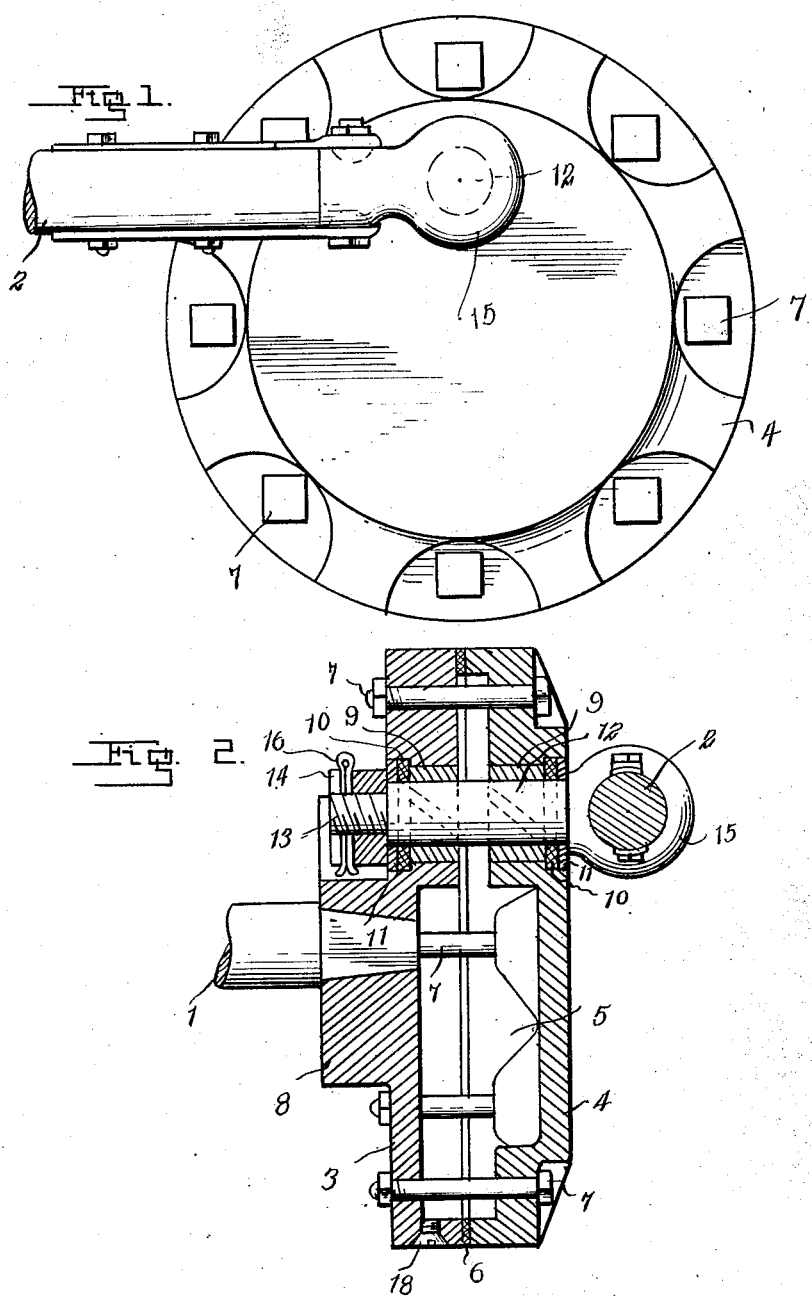
INVENTOR.
A. R. Preece
BY
Lacey & Lacey, ATTORNEYS Patented Apr. 29, 1930

1,756,661

UNITED STATES PATENT OFFICE

ARCHIE R. PREECE, OF SAN MARCOS, TEXAS, ASSIGNOR OF ONE-HALF TO WALTER H. BAUERSCHLAG, OF SAN MARCOS, TEXAS

FLYWHEEL AND SELF-OILING WRIST PIN

Application filed August 16, 1928. Serial No. 300,013.

The invention provides a combined balance wheel and crank pin wherein the latter is loose and adapted to be automatically lubricated, the oil being contained in a chamber formed in the balance wheel and fed therefrom to the pin as required, thereby doing away with the usual wrist pin box and oil cup and the objectionable features incident thereto.

The invention consists of a combined fly wheel adapted to receive a quantity of lubricant, and a wrist pin loosely mounted therein and automatically oiled and having the pitman or other transmission rod rigidly connected thereto.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which:—

Figure 1 is a side view of a self oiling wrist pin and fly wheel embodying the invention, showing the pitman or analogous rod in position.

Figure 2 is a vertical, central, transverse sectional view of the fly wheel showing the wrist pin in full lines and a portion of the drive shaft.

Corresponding and like parts are referred to in the following description and designated in both views of the drawing by like reference characters.

The numeral 1 denotes a drive shaft and 2 a pitman or other transmission rod. The fly wheel is chambered and the wrist pin is loosely connected thereto and has the pitman 2 rigidly connected thereto. This arrangement dispenses with the ordinary wrist pin box and oil cup which have proven objectionable particularly in mowing machinery and agricultural implements generally.

The fly wheel comprises similar parts 3 and 4 which when assembled enclose a chamber 5 which is adapted to receive a lubricant for oiling the wrist pin. A gasket 6 is interposed between the parts 3 and 4 to insure a tight joint. Bolts 7 pass through openings formed in the parts 3 and 4 and serve to connect said parts and clamp the gasket therebetween. The central portion of the part 3 is thickened to admit of a substantial joint between it and the drive shaft 1. The enclosed chamber 5 is formed partly in each of the members 3 and 4 and may be of any capacity to hold a quantity of lubricant for a reasonable period. Transverse openings are formed in the parts 3 and 4 in coincident position for reception of the wrist pin. A bushing 9 is pressed into each of the wrist pin receiving openings and is formed with a spiral groove for properly feeding the oil from the chamber to the wrist pin.

That portion of each of the parts 3 and 4 receiving the bushing 9 is made thicker than the remaining portion for stability and to properly support the bushings and sustain the stresses of the wrist pin. The outer portion of each of the openings is enlarged to receive a packing 10 and a metal washer 11, the packing 10 being confined between the outer end of the bushing 9 and the washer 11.

The numeral 12 designates the body of the wrist pin one end of which is reduced and externally threaded, as indicated at 13, to receive a castellated nut 14, and having a head 15 at its opposite end to which the pitman 2 or analogous part is rigidly connected. The head 15 is elongated as indicated most clearly in both views of the drawing. The reduced end 13 of the wrist pin is transversely pierced to receive a cotter pin 16 which prevents displacement of the nut 14 and holds it in the required adjusted position. Lubricant is supplied to the chamber 5 through an opening formed in the outer edge of the fly wheel and which is normally closed by means of a plug 18.

Having thus described the invention, I claim:—

1. A fly wheel comprising separable parts having a chamber formed therebetween to receive lubricant, openings formed in the parts in coincident relation, bushings in said openings, packing and washers fitted in the outer ends of the openings, and a wrist pin loosely mounted in the bushings and passing through the packing and washers.

2. A fly wheel comprising separable parts having a chamber formed therebetween and provided with transverse openings in coincident position, the outer ends of the openings being enlarged, means for securing the parts when assembled, a bushing in each of the openings and having a spiral groove formed in its inner wall for distributing the oil, packing and washers in the outer enlarged ends of the openings, a wrist pin mounted in the bushings and having a head at one end and its opposite end reduced and threaded, and a nut mounted upon the reduced end of the wrist pin and serving in conjunction with the head thereof to hold the said wrist pin in place.

In testimony whereof I affix my signature.

ARCHIE R. PREECE. [L. S.]